(12) United States Patent
Shishido

(10) Patent No.: US 6,983,474 B2
(45) Date of Patent: Jan. 3, 2006

(54) DISK CLAMPING DEVICE

(75) Inventor: Hiroyuki Shishido, Hachiouji (JP)

(73) Assignee: Kabushiki Kaisha Kenwood, Tokyo (JP)

(*) Notice: Subject to any disclaimer, the term of this patent is extended or adjusted under 35 U.S.C. 154(b) by 374 days.

(21) Appl. No.: 10/296,315

(22) PCT Filed: Feb. 22, 2002

(86) PCT No.: PCT/JP02/01619

§ 371 (c)(1),
(2), (4) Date: Nov. 22, 2002

(87) PCT Pub. No.: WO02/077990

PCT Pub. Date: Oct. 3, 2002

(65) Prior Publication Data

US 2003/0133398 A1 Jul. 17, 2003

(30) Foreign Application Priority Data

Mar. 23, 2001 (JP) ........................................ 2001-084277

(51) Int. Cl.
*G11B 17/028* (2006.01)

(52) U.S. Cl. ..................................................... 720/713
(58) Field of Classification Search ................ 720/713, 720/706–707
See application file for complete search history.

(56) References Cited

FOREIGN PATENT DOCUMENTS

| JP | 62-022263 | 1/1987 |
| JP | 02-39343 | 3/1990 |
| JP | 07-032730 | 6/1995 |
| JP | 09-17081 | 1/1997 |
| JP | 09-017081 | 1/1997 |
| JP | 10-134464 | 5/1998 |
| JP | 11-031350 | 2/1999 |

OTHER PUBLICATIONS

International Search Report dated Apr. 8, 2002.

*Primary Examiner*—George Letscher
(74) *Attorney, Agent, or Firm*—Eric J. Robinson; Robinson Intellectual Property Law Office, P.C.

(57) ABSTRACT

A disc cramp device which holds a disc by sandwiching it by a turn table and a cramper, according to the present invention, includes a cramper arm which is rotated in a direction to move close to the turn table and a direction to move away from it, a plate spring member, a part of which is fixed to the cramper arm, which lifts the cramper during an uncramping time, and which presses an upper center of the cramper in a direction of the turn table during a cramping time. It is constructed so that by providing tongue pieces for pressing the upper center of the cramper at a tip end portion of the cramper arm, the plate spring member presses the cramper while it is held at both sides during the uncramping time, and the plate spring member is pressed by the fixing member to be elastically deformed during the uncramping time. Consequently, according to the disc cramp device of the present invention, the number of components is reduced, and the height of the space for transferring the disc can be made large with respect to the height of the entire device, in addition to which, the driving force in a cramping and uncramping operations can be made small.

2 Claims, 6 Drawing Sheets

DISK CLAMPING DEVICE

TECHNICAL FIELD

The present invention relates to a disc reproducer, and particularly, to a disc cramp device for cramping a disc between a turn table for rotationally driving the disc and a cramper.

BACKGROUND ART

An example of a disc cramp device of a conventional disc reproducer is shown in FIG. 5. A disc motor 2 is fixed to a reproduction part chassis 1 shown in the drawing, and a turn table 3 is fixed to a rotating shaft of the disc motor 2.

A cramper arm 10 is rotatably supported at the reproduction part chassis 1, and is rotated in the direction A in the drawing by a drive mechanism not shown. The cramper arm 10 supports a cramper 6, and at a uncramping time in the state shown in FIG. 5, it lifts the cramper 6 to above the turn table 3.

In the state shown in FIG. 5, when a disc (not shown) is transferred between the turn table 3 and the cramper 6, a cramping operation of the disc is performed in such a manner that the cramper arm 10 is rotated in the counter-clockwise direction to press the cramper 6 to make the turn table 3 and the cramper 6 sandwich the disc to hold it.

The conventional disc cramp device shown in FIG. 5 has the problem that a height "a" of a space in which the disc can be transferred is small with respect to a height H of the entire device during the uncramping time since the cramper is inclined during the uncramping time.

Another example of the conventional disc cramp device is shown in FIG. 6. In FIG. 6, the components having the same functions as those shown in FIG. 5 are given the same reference numerals and symbols and the detailed explanation will be omitted. In this example, an upper chassis 11 holding the cramper 6 is supported by the reproduction part chassis 1 to be movable up and down, and by the slider 12 moving in the direction B shown in the drawing, the upper chassis 11 is driven in an up-and-down direction (the direction C shown in the drawing).

In the conventional disc cramp device shown in FIG. 6, the cramper is held horizontally during the uncramping time, and therefore a height "b" of the space in which the disc can be transferred can be made large with respect to the height H of the entire device during the uncramping time, but there arises the problem that the number of components of a vertically driving mechanism of the upper chassis 11 increases, and the production cost becomes high as the result.

On the other hand, a disc cramp device proposed in Japanese Patent Laid-open No. 9-17081 is constructed by adopting the structure in which the cramp arm is made by fastening an elastically deformable plate spring member to a rigid member so that a cramper is held by the plate spring member, and the rigid member is rotated, whereby a cramping and uncramping operations are performed, and a cramper stopping member restricts the movement of the cramper in a direction away from the turn table to elastically deform the plate spring member during the uncramping time.

According to this disc cramp device, height of a space in which the disc is transferred is made large with respect to the height of the entire device, and the number of components can be decreased. However, since this device adopts the structure in which the rigid member presses the plate member while holding it at only one side during a cramping time, there arise the problems that the plate thickness of the plate spring member has to be made larger in order to add large pressure to the cramper, and that a large driving force is required to elastically deform the plate spring member during the uncramping time.

This invention is made in view of the above-described points, and has its object to provide the disc cramp device with a simple construction and the smaller number of components, in which a large height of the space in which the disc is transferred can be secured with respect to the height of the entire device, and only a small driving force is required in the cramping and uncramping operations.

DISCLOSURE OF THE INVENTION

In order to attain the above-described object, a disc cramp device of the present invention is constructed by comprising a cramper arm which is rotated in a direction to move close to a turn table and a direction to move away from it, a plate spring member, a part of which is fixed to the cramper arm, which lifts the cramper during an uncramping time, and which presses an upper center of the cramper in a direction of the turn table during a cramping time, and tongue pieces which are provided at the cramper arm to press both sides of a portion of the plate spring member, which supports the cramp, the cramp device being configured so that the plate spring member is elastically deformed by reaction of the fixing member. In one aspect of the present invention, the elastic deformation of the aforementioned spring member is caused by drag occurring when the aforementioned plate spring member is pressed against the aforementioned fixing member. In another aspect, the elastic deformation of the aforementioned spring member is caused by drag occurring when the aforementioned cramper is pressed against the aforementioned spring member.

Since the disc cramp device of the present invention adopts the structure as described above, the plate spring is restricted in its movement by the fixing member to be elastically deformed, and holds the cramper horizontally, thus making it possible to increase the vertical width of the disc transfer space with respect to the height of the entire device. The plate spring member is pressed at both sides of the portion for holding the cramper by the tongue pieces provided at the tip end portion of the cramper arm. Consequently, the plate spring member presses the cramper while it is held at both sides in the cramping state, and therefore the plate thickness of the plate spring member can be made small. Meanwhile, in the uncramping state, (since the plate thickness of the plate spring is small) the plate spring member can be elastically deformed with a small force, and the driving force for cramping and uncramping can be made small. In addition, the cramping and uncramping operations of the present invention are performed by a rotating operation of the cramper arm, and its mechanism is extremely simple, which can be produced with the small number of components, thus making it possible to reduce the production cost.

BEST MODE FOR CARRYING OUT THE INVENTION

An embodiment of a disc cramp device according to the present invention will be explained in detail below with reference to the drawings. The illustration in each drawing has its only object to contribute to understanding of the structure of the device of the present invention, and the reduction scales between individual components and the drawings are not necessarily the same.

Figure 1:
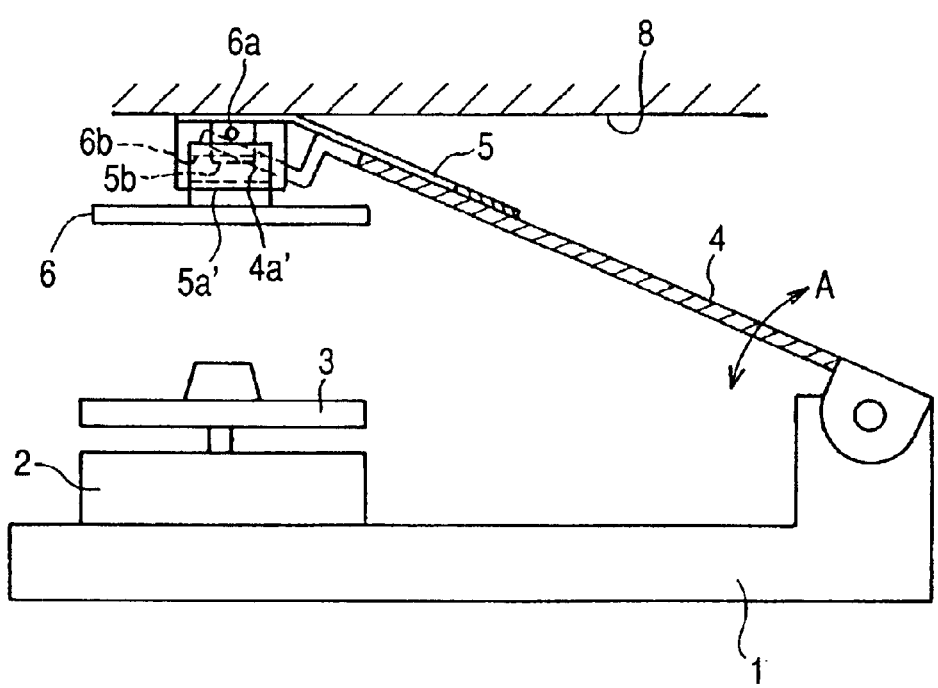
FIG. 1 is a partial sectional view showing a disc cramp device as a first embodiment of the present invention.
Figure 2:
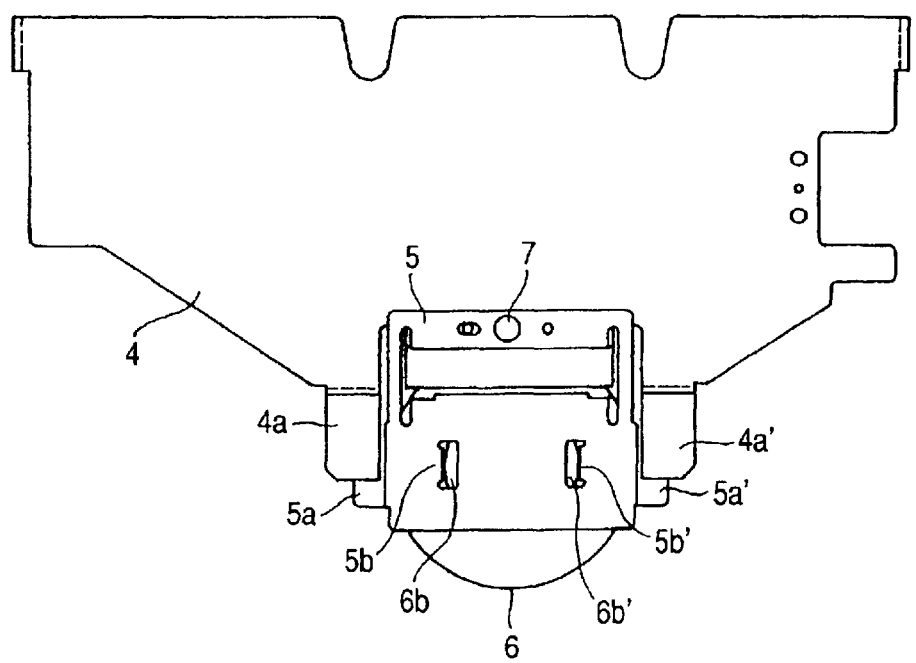
FIG. 2 is a plan view showing a part which is connected to a cramper arm in the same disc cramp device.

FIG. 1 is a partial sectional view showing a disc cramp device of a first embodiment of the present invention, and FIG. 2 is a plan view showing a part of the same disc cramp device. In these drawings, the same components having the same functions as those in the prior art are given the same reference numerals and symbols and the detailed explanation of them will be omitted.

Figure 3:
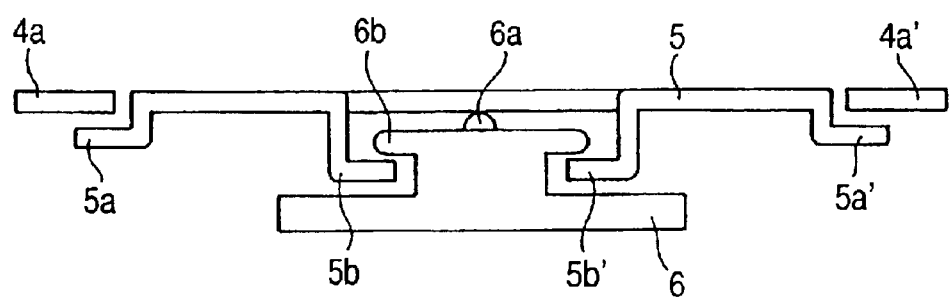
FIG. 3 is a sectional view of a structure shown in FIG. 2 seen from a lower side (to the paper surface)

A rigid cramper arm 4 shown in FIG. 1 and FIG. 2 is rotatably supported by a reproduction part chassis 1, and is rotated in the direction A by a driving mechanism (not shown). A plate spring member 5 is positioned and fastened onto the cramper arm 4 with a screw 7. As shown in FIG. 3, the plate member 5 is provided with a pair of tongue pieces 5b and 5b' extending in an L-shape to face each other under the plate member 5. These tongue pieces 5b and 5b' are located under a flange 6b of a cramper 6, so as to lift the cramper 6 when the cramper arm 4 is rotated upward.

An undersurface of a tip end portion of the plate spring member 5 opposes a center projection 6a of the cramper 6, and when the cramper arm 4 is rotated downward, the undersurface presses the center projection 6a of the cramper 6 to bring the cramper 6 into pressure contact with the disc to be in the cramp state.

At a tip end portion of the cramper arm 4, provided are a pair of tongue pieces 4a and 4a' extending in the L-shape under it. These tongue pieces 4a and 4a' presses the tongue pieces 5a and 5a' of the plate spring portion 5 on both sides of the portion pressing the center projection 6a, whereby the cramper 6 can be pressed with the plate spring member 5 being held at both sides.

As shown in FIG. 1, in an uncramping state in which the cramper arm 4 is rotated in the clockwise direction, the plate spring member 5 is restricted in its movement by a fixing member 8. The plate spring member is elastically deformed to hold the cramper 6 horizontally. Accordingly, the height of a disc transfer space can be made higher with respect to the height of the entire device.

As described above, in the device of the present invention, the structure of pressing the cramper 6 with the plate spring member 5 held at both sides, the plate thickness of the plate spring member can be made small. In the uncramping state, the plate spring member 5 can be elastically deformed with a small force, and the driving force for cramping and uncramping can be made small.

Figure 4:
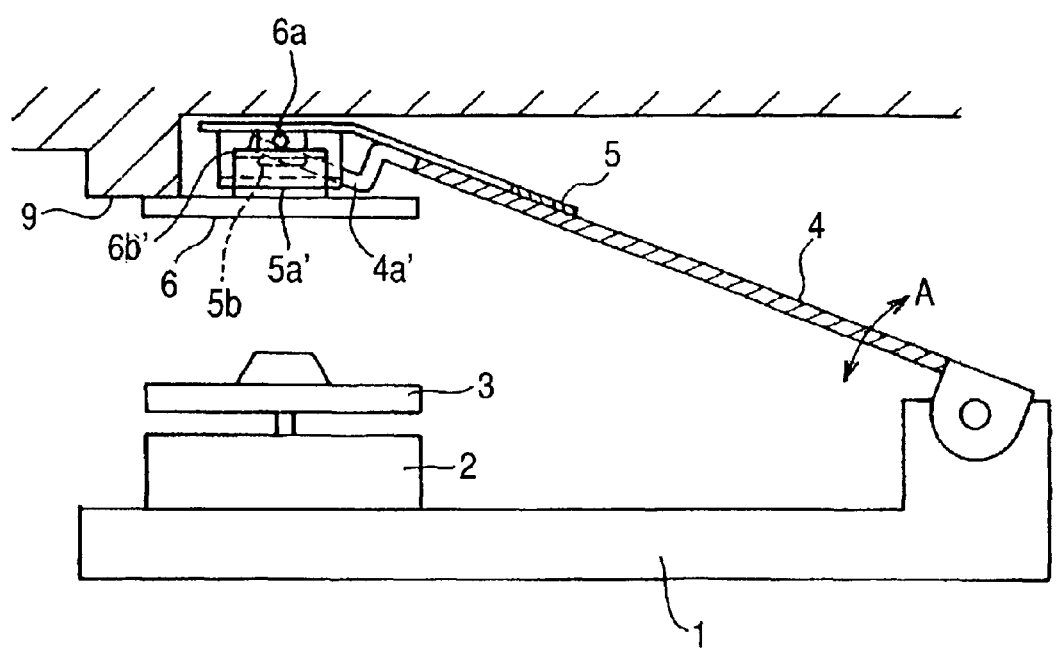
FIG. 4 is a partial sectional view showing a disc cramp device as a second embodiment of the present invention.
Figure 5:
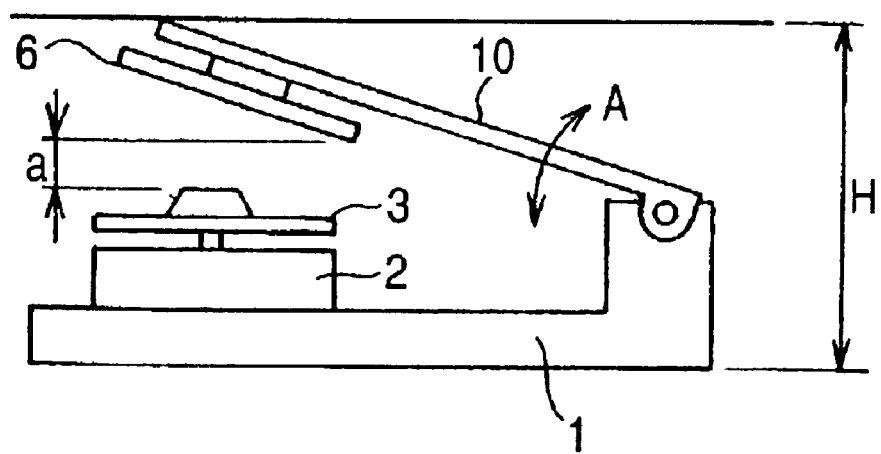
FIG. 5 is a side view showing an example of a conventional disc cramp device.
Figure 6:
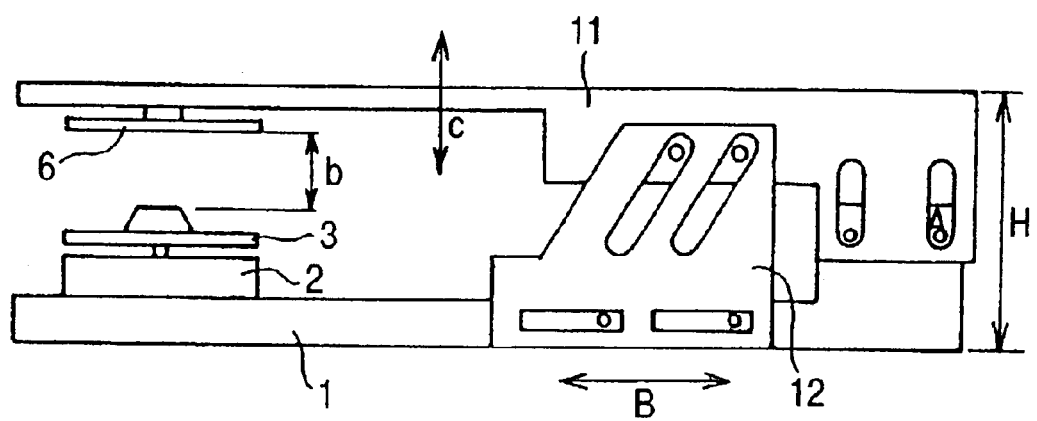
FIG. 6 is a side view showing another example of the conventional disc cramp device.

FIG. 4 is a partial sectional view showing a disc cramp device as a second embodiment of the present invention. In this drawing, the components having the same functions as in the first embodiment are given the same reference numerals and the detailed explanation will be omitted.

In the second embodiment, the cramper 6 is restricted in its movement by a fixing member 9 in the unclamping state in which the cramper arm 4 is rotated in the clockwise direction as shown in FIG. 4. Consequently, when the cramper 6 is pressed against the fixing member, the plate spring member 5 is elastically deformed to hold the cramper 6 horizontally. Accordingly, the height of the disc transfer space can be made higher with respect to the height of the entire device.

In such an uncramping state, the cramper 6 is brought into pressure contact with the plate spring member 5 by an elastic force of the plate spring member 5, and therefore no looseness occurs, thus providing the advantage of causing no colliding noise between the cramper 6 and the plate spring member 5 even when the main body vibrates as an on-vehicle device.

As described above, in the device of the present invention, the structure in which the plate spring member 5, which is held at both sides, presses the cramper 6, and therefore the plate thickness of the plate spring member can be made small. Consequently, in the uncramping state, the plate spring member 5 can be elastically deformed with a small force, and the driving force for uncramping and cramping can be made small, which is the same as in the first embodiment.

INDUSTRIAL APPLICATION

According to the disc cramp device of the present invention, the cramping and uncramping operations of the disc is performed by rotational operation of the cramper arm, and therefore the mechanism is simplified, thus making it possible to keep the production cost low.

In the state in which the cramp arm is rotated into the uncramping state, the movement of the plate member or the cramper is restricted by the fixing member, whereby the plate spring member is elastically deformed to hold the cramper horizontally, and therefore a large vertical width of the disc transfer space can be secured with respect to the height of the entire device.

Further, since the structure in which the plate spring member presses the cramper while it is held at both sides, the plate thickness of the plate spring member can be reduced, and therefore the plate spring member can be elastically deformed with a small force in the uncramping state, thus making it possible to reduce the driving force for cramping and uncramping.

What is claimed is:

1. A disc clamp device for holding a disc by sandwiching it by a turn table and a clamp (6), the disc clamp device comprising:

a clamp arm capable of rotating in a direction moving close to the turn table and a direction moving away from it;

a plate spring member (5), a part of which is fixed to the clamp arm, and which has first tongue pieces (5b, 5b') located under a flange (6b) of the clamp (6) for lifting the clamp by the first tongue pieces (5b, 5b') upon an unclamping state and pressing an upper center of the clamp in a direction of the turn table during a clamping state;

second tongue pieces (4a, 4a') provided at the clamp arm to press third tongue pieces (5a, 5a') of the plate spring member on both sides of a portion pressing a center projection (6a) and wherein the plate spring member (5) is configured so that the plate spring member 5 is pressed against a fixing member (8) and elastically deformed by the reaction caused by the pressure against the fixing member (8), upon the unclamping state.

2. A disc clamp device for holding a disc by sandwiching it by a turn table and a clamp (6), the disc clamp device comprising:

a clamp arm capable of rotating in a direction moving close to the turn table and a direction moving away from it;

a plate spring member (5), a part of which is fixed to the clamp arm, and which has tongue pieces (5*b*, 5*b*') located under a flange (6*b*) of the clamp (6) for lifting the clamp by the tongue pieces (5*b*, 5*b*') upon an unclamping state and pressing an upper center of the clamp in a direction of the turn table during a clamping state;

tongue pieces (4*a*, 4*a*') provided at the clamp arm to press another tongue pieces (5*a*, 5*a*') of the plate spring member on both sides of a portion pressing a center projection (6*a*), and wherein the plate spring member (5) is configured so that the clamp (6) is pressed against the plate spring member (5) and elastically deformed by the reaction caused by the pressure against the plate spring member (5), upon the unclamping state.

\* \* \* \* \*